(No Model.) 3 Sheets—Sheet 1.
C. C. SHEPHERD.
MACHINE FOR GLUING SLATE AND OTHER FRAMES.
No. 312,391. Patented Feb. 17, 1885.
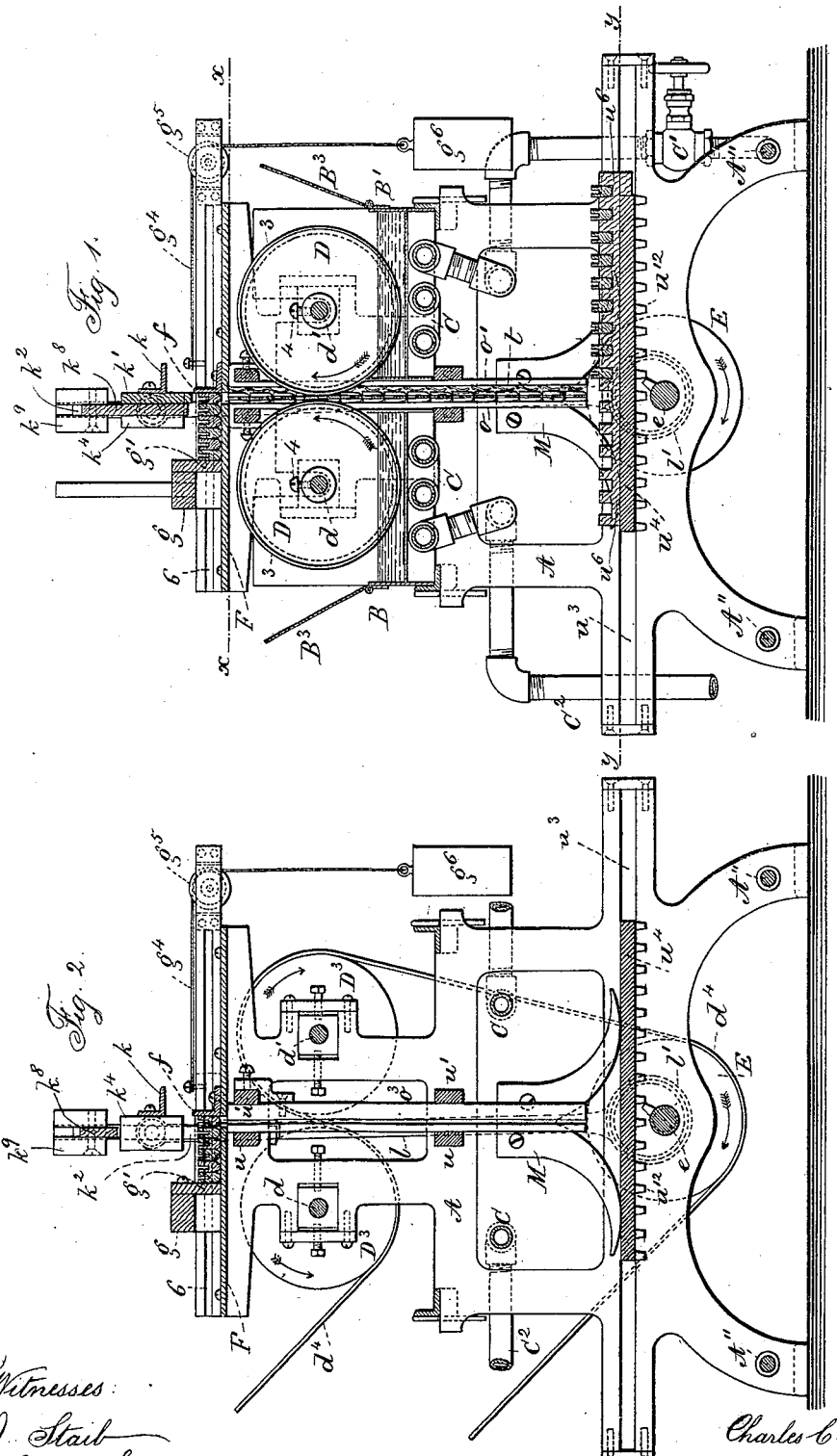
Witnesses:
J. Staib
Chas. H. Smith
Inventor
Charles C. Shepherd
per Lemuel W. Serrell
atty (No Model.)  3 Sheets—Sheet 2.
C. C. SHEPHERD.
MACHINE FOR GLUING SLATE AND OTHER FRAMES.
No. 312,391.  Patented Feb. 17, 1885.
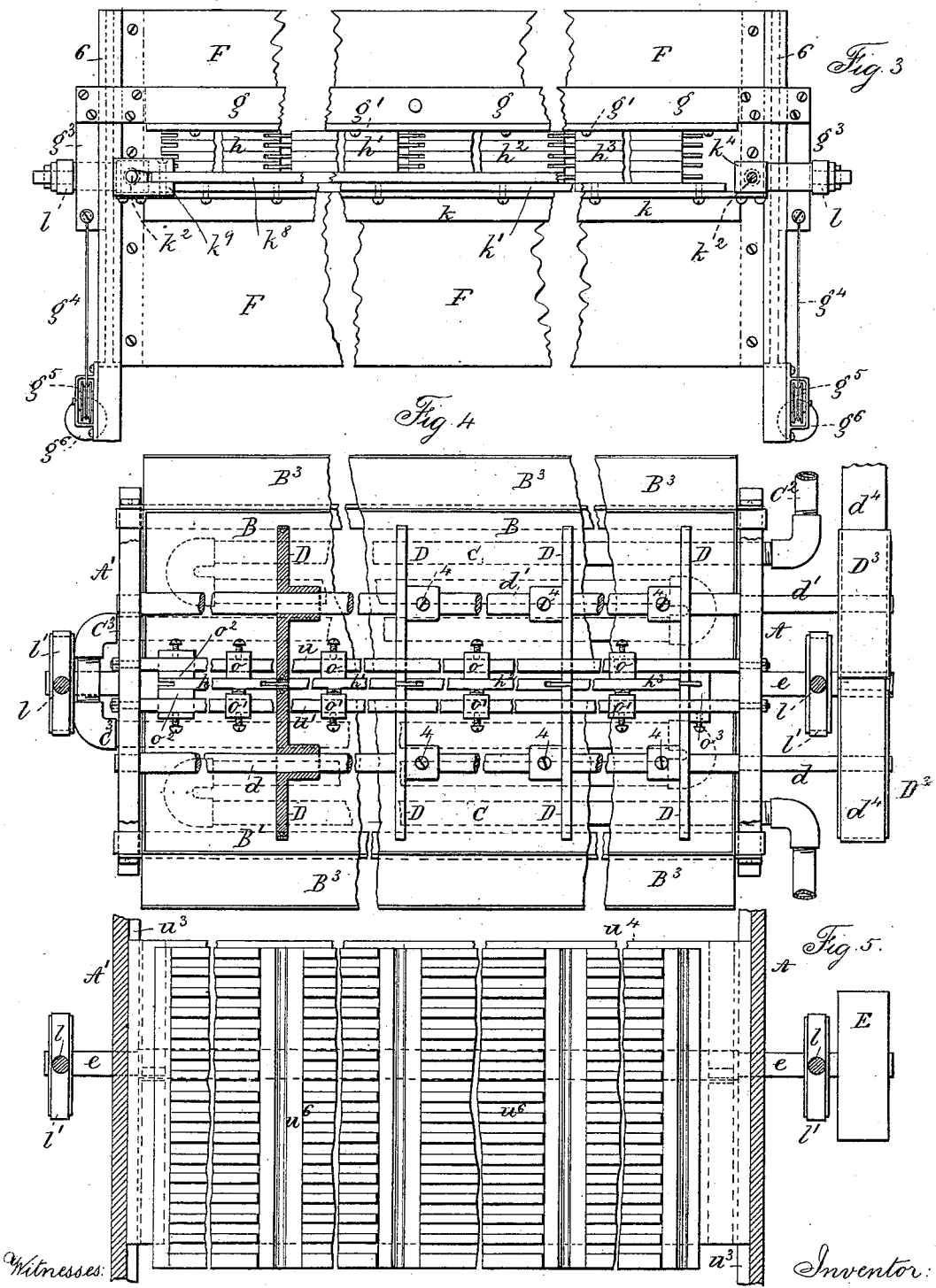

(No Model.)   3 Sheets—Sheet 3.
C. C. SHEPHERD.
MACHINE FOR GLUING SLATE AND OTHER FRAMES.
No. 312,391. Patented Feb. 17, 1885.
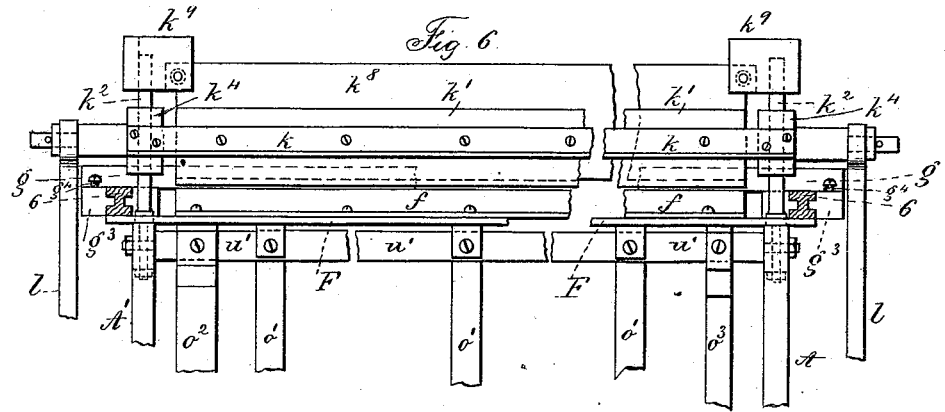
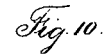
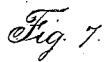
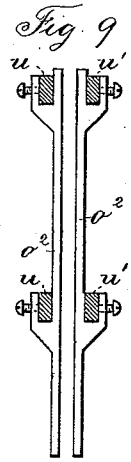
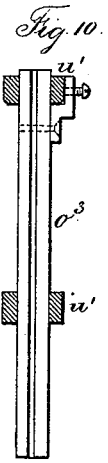
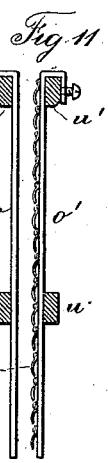
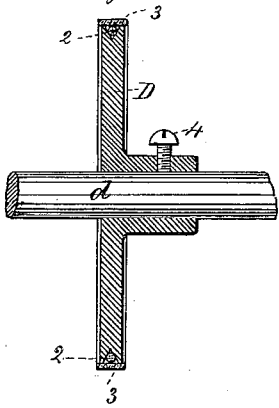
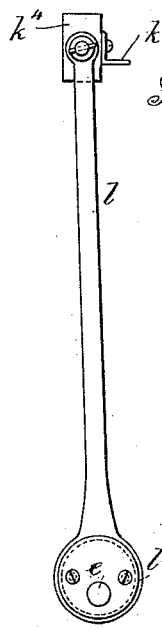
Witnesses:
I. Staib
Chas. H. Smith
Inventor
Charles C. Shepherd
per Lemuel W. Serrell atty
N. PETERS, Photo-Lithographer, Washington, D. C.

UNITED STATES PATENT OFFICE.

CHARLES C. SHEPHERD, OF PASSAIC, NEW JERSEY.

MACHINE FOR GLUING SLATE AND OTHER FRAMES.

SPECIFICATION forming part of Letters Patent No. 312,391, dated February 17, 1885.

Application filed October 18, 1884. (No model.)

*To all whom it may concern:*

Be it known that I, CHARLES C. SHEPHERD, of Passaic, in the county of Passaic and State of New Jersey, have invented an Improvement in Machines for Gluing Slate and other Frames, of which the following is a specification.

This improvement is for conveying the frames successively into contact with wheels that apply adhesive materials to the tenons after the tenons have been slipped partially into the mortises. The slates or other articles are inserted into the frames and the frames are closed up around them, and the tenons are held into the mortises by the glue.

In the drawings, Figure 1 is a vertical section of the machine at the glue-wheels. Fig. 2 is a similar view near the inside of one of the frames. Fig. 3 is a plan at the top of the machine. Fig. 4 is a sectional plan at the line $x\ x$. Fig. 5 is a sectional plan at the line $y\ y$. In these figures, 3, 4, and 5, the parts are broken open so as to be shortened. Fig. 6 is an elevation of the upper part or head of the machine, the guide-slides being in section. Fig. 7 is a section of one of the glue-wheels. Fig. 8 shows the eccentric for moving the frames successively. Figs. 9, 10, and 11 represent the faces of the vertical slides for the slate-frames.

The frames A A' are connected by the cross-bolts A'', and between them there are pans B B' for holding glue or similar adhesive material. The sides of the pans extend down below the bottoms for forming chambers that receive the pipes $c\ c$, that contain steam or hot water for keeping the glue sufficiently soft or limpid. The pipes pass back and forth, as shown by dotted lines in Fig. 4, and the supply is regulated by the cock C', and the water of condensation passes off by the pipe $C^2$.

In order to connect the coils beneath the respective pans and to leave a free space between the said pans, the pipes at $C^3$ pass through the frame A', and are connected together outside the same.

Upon the frames A' A there are journal-boxes for the cross-shafts $d\ d'$, upon each of which there are the glue-wheels D. These wheels are each made, as shown in Fig. 7, with a groove around the periphery, into which a cord, 2, is received, and to this a strip of felt or similar material, 3, is sewed. Each wheel D is provided with a hub and clamping-screw, 4, so that it can be set upon the shaft $d$ at the desired place and secured, and there are two or more of these wheels—usually four upon each shaft—so that there will be one wheel to each side of each tenon. These wheels are at their lower portion in the glue in the trough, and they are revolved by the pulleys $D^3$ at the outer ends of the respective shafts and the belt $d^4$, that passes under one pulley, over the other, and down beneath the pulley E upon the shaft $e$, so that all the pulleys are driven at the proper speed and in the right direction. There are doors $B^3$, that serve to close the space above the glue-pans and retain the heat, so as to keep the atmosphere from the glue-wheels and keep the glue moist. Above the glue-wheels there is a platform, F, that is supported upon the top of the frames A A', and this platform is made in two parts, so that there is a long slot directly over the space between the glue-pans. There is a fence or stop, $f$, at one edge of this slot, and there is a moving feed-bar, $g$, across over the other part of this platform, having a pusher, $g'$, reaching down to the surface of the platform. The feed-bar $g$ extends at its ends outside the frames, and receives the steady-bars $g^3$ and cords $g^1$, that pass over the pulleys $g^5$ to the weight $g^6$, so that these weights draw the feed-bar toward the fence $f$. There are slides 6 that serve to guide the steady-bars $g^3$ and feed-bar $g$. These slides 6 are affixed upon the platform F. The pieces $h\ h'$ $h^2\ h^3$, that are to form the frame, are previously prepared, and grooved on their edges and slotted and tenoned, and the tenons are partially put into the slots, as shown in Fig. 3. The blank frames, laid out straight, are placed upon the platform F after the feed-bar $g$ and pusher $g'$ have been drawn back, and the said feed-bar and pusher are then allowed to press the frames constantly toward the fence $f$ and supply the same as the frames are carried successively down through the slot in the platform and pass between the glue-rollers. The cross-head K of angle-iron is provided with the vertical pushing-slat $k'$ at one of its sides, the cross-head is guided at its ends by blocks $k^4$, that slide upon the vertical guides $k^2$, and the parts are reciprocated up and down by the action of the connecting-rods $l$ and eccentrics $l'$ upon the shaft $e$, the rods being connected to studs projecting from the slide-block $k^4$. The stationary plate $k^8$ is fastened by the blocks $k^9$ to the top ends of the guides $k^2$, and strengthens the parts. There are cross-bars $u\ u'$ between the frames A A', and upon these are affixed the vertical guides $o\ o'$, between which the slate-frames descend, and there are end guides, $o^2$ and $o^3$, that keep the frames in their proper positions endwise, and these are adapted to the tenon at one end of each frame and the square end with the mortise at the other end of such frame, and upon the surfaces of the guide $o'$ there are frictional springs or detainers $t$, as seen in Fig. 11.

In the inner faces of the frames A A' there are slideways $u^3$, in which is received a bed, $u^4$, with rack-teeth upon the under surface near each end, as at $u^{12}$, and there is a tooth on the shaft $e$ adjacent to each rack, so that the bed is moved along progressively each revolution of the shaft $e$, and the movable grooved holder $u^6$ is laid upon and moves with the bed $u^4$, there being a downward projection at one edge of the holder to come into contact with the edge of the bed and keep the parts in place. As the slate-frames in their open condition are forced down between the guideways $o\ o'\ o^2\ o^3$ they move between the glue-wheels, and such glue-wheels are placed in such positions that the glue on the edges of the wheels comes into contact with the opposite sides of the tenons, as shown in Fig. 4, and the glue may also touch the shoulders upon the wood at the bases of the tenons. The glue is to be mixed so that it will not set rapidly, and the frames as glued are moved down successively, and each time one of the frames is pushed in at the top by the pusher $k'$ a glued frame is pushed out at the bottom and falls into one of the grooves in the holder $u^6$, and by it is carried along, and another groove of the holder $u^6$ is brought into position for receiving the next glued frame. A number of these holders $u^6$ may be provided, so as to be successively laid upon the bed $u^4$, filled with the glued frames, and taken off and another holder laid in its place. The slates are entered in succession into the grooved frames, and the frames folded up around the slates, the end tenon entering the end slot as the parts of the frame are brought entirely around the slate, and the tenons are pressed tightly home in the slots and the glue holds the parts together.

In order that the bed $u^4$ is not carried too far by virtue of its momentum, I provide a frictional detainer, M, of wood or other material, on each end of the bed $u^4$. These detainers are attached to the frames A A'.

I claim as my invention—

1. In a machine for gluing frames, the combination, with the receptacles for glue and the wheels within the same, of the vertical guides $o\ o'$, through which the respective frame-pieces are made to pass, the platform F, upon which the pieces for the frames are laid, and means, substantially as specified, for moving the same along, and the reciprocating pusher for carrying the frame-pieces down in the vertical guides and between the wheels, substantially as set forth.

2. The combination, in a machine for gluing frames, of a platform for the reception of the frame-pieces, a fence against which the frame-pieces stop when moved, a cross-bar and cords and weights to move the said frame-pieces toward the fence, a pusher and means, substantially as specified, for moving the same up and down and operating upon the frame-pieces successively, vertical guides between which such frame-pieces pass, receptacles for glue, and wheels for applying glue from the same to the tenons of the frame-pieces, heating-pipes for keeping the glue hot, a grooved holder for receiving the frame-pieces, and means for moving the same along progressively, substantially as specified.

3. The combination, with the receptacles for glue, of glue-wheels in two ranges, and the two shafts for supporting such wheels, vertical guides between the glue-wheels between which the frame-pieces pass, and springs in said guides for applying a friction to the pieces of the frames while being glued, and mechanism, substantially as specified, for moving the frame-pieces downwardly and progressively in such guides and between the glue-wheels, as set forth.

Signed by me this 10th day of October, A. D. 1884.

CHAS. C. SHEPHERD.

Witnesses:
GEO. T. PINCKNEY,
WILLIAM G. MOTT.